United States Patent [19]

Hayes

[11] 3,963,064
[45] June 15, 1976

[54] PROCESSING WHOLE TREES

[75] Inventor: George T. Hayes, Temiscnaning, Canada

[73] Assignee: Domtar Limited, Montreal, Canada

[22] Filed: Jan. 27, 1975

[21] Appl. No.: 544,633

[52] U.S. Cl. .......................... 144/309 AC; 144/2 Z; 144/208 B; 144/311; 241/101.7
[51] Int. Cl.² ..................... B27L 1/00; A01G 23/08
[58] Field of Search ........ 144/208 R, 208 B, 208 D, 144/311, 2 Z, 3 D, 34 R, 34 A, 34 B, 34 C, 34 D, 309 AC; 241/30, 101.7

[56] References Cited
UNITED STATES PATENTS

| | | | |
|---|---|---|---|
| 3,460,594 | 8/1969 | Burkhalter | 144/34 R X |
| 3,489,190 | 1/1970 | Voronitsyn et al. | 144/2 Z |
| 3,746,063 | 7/1973 | Smiltneek | 144/311 X |
| 3,822,042 | 7/1974 | Roy | 241/101.7 X |
| 3,866,639 | 2/1975 | Kantola et al. | 144/208 B |

Primary Examiner—Othell M. Simpson
Assistant Examiner—W. D. Bray
Attorney, Agent, or Firm—C. A. Rowley

[57] ABSTRACT

A system of substantially whole tree utilization wherein the trees are felled and subsequently slashed with the branches and top section intact to form discrete tree sections including a top section and branched bole sections, and these sections are fed into a conventional drum debarker to preferably dry and de-bark and de-branch the sections, thereby to provide branched and de-barked wood for further processing and separating bark, branches and needles. The bark and branches may be separated from each other and from the needles. The needles may be processed separately to produce chemical compounds for pharmaceutical purposes or any other use. The system of the present invention permits more economic harvesting of wood an increases the utilization of the tree by permitting utilization of not only the bole section, but also the normally unmerchandizable top and branches together with the needles.

4 Claims, 1 Drawing Figure

PROCESSING WHOLE TREES

FIELD OF THE INVENTION

The present invention relates to whole tree utilization. More specifically, the present invention relates to de-barking of whole trees in sections.

DESCRIPTION OF THE PRIOR ART

It is conventional when harvesting trees to take only the merchandizable bole section of the tree and to leave the remainder in the forest. The unmerchandizable top of the bole, i.e. the section less than 4 in. in diameter together with the branches are left in the forest. Theoretically, the top as above-indicated should be no more than 4 in. in diameter at its base, but, depending on the harvesting technique is sometimes larger. For example, harvesters that fell and de-limb the tree do not always cut at the 4 in. section, the practice being to raise the de-limbing head to the top of the boom and then cut, even though the diameter may be greater than 4 in. Thus, the larger trees, the top section lost or left in the bush may be considerably greater than the commercially defined unmerchandizable top of the bole.

Attempts have been made to increase the amount of fibre, generally by chipping the whole tree branches and all without de-barking and by cooking the chips and bark simultaneously to obtain a pulp. This technique, while it does permit maximum utilization of the tree is usually only practiced with relatively small trees, less than 40 feet in height, and maximum pulping efficiency nor does it permit selection of the tree sections for either lumber or chips.

The concept of de-barking of limbed sections of trees is not new, but attempts to de-bark such sections having required the use of special equipment.

For example, in Canadian Pat. No. 492,321, issued Apr. 1, 1953 to Elkholm et al, a de-barker employing high pressure water jets for removing the bark for individual tree lengths having limbs of up to 20 in. projecting therefrom is disclosed. In this arrangement, the tree lengths are individually processed and are presented to the hydraulic jets by a manually controlled device whereby the operator may ensure that the jets are directed to all the parts of the tree. This device is obviously adapted to de-barking of relatively large tree sections such as those found on the Western Coast of Canada as it would be extremely expensive to individually handle trees of the size found in North Eastern Canada in this manner. Obviously the technique does not permit dry de-barking and thus does not provide bark with high calorific value.

It has also been proposed to de-bark tree tops and the like by using a special de-barker as taught in U.S. Pat. No. 3,746,063, issued July 17, 1973 to Smiltneek. In this arrangement, the de-barker is used in the bush but it requires the tree lengths to be cut into relatively short sections for passage therethrough. The apparatus resembles a ball mill in that a plurality of discrete impacting elements or members are contained in a drum into which the short sections are introduced. These elements engage the short sections and de-bark same. In this device it is necessary to reduce the tree tops to relatively short lengths and to batch process them using the impacting members to abrasively remove the bark from the short sections, which obviously is expensive and necessitates special equipment and leaves the bark in the bush.

The conventional practice is de-branching and topping the tree in the woods and transporting only the acceptable portion, i.e. the merchandizable bole to the mill. This technique of topping de-branching in the forest has led to the use of either a number of trained woodsmen working with chain saws or relatively complex harvesting equipment.

The present invention contemplates cutting of a tree and packing the tree without de-limbing or topping to the roadside where it will be loaded on trucks and the whole tree carried to the mill. This type of harvesting is particularly suited for many softwood species that do not have large branches, i.e. the branch size normally is less than about 3 in. maximum diameter, and with the bulk of the branches, less than about 1 in. diameter. Suitable hardwoods, such as poplar and birch may also be handled using the present invention provided the branches are not too large. In some cases the present invention may be practiced even with larger branch trees if the bole is cut into short enough sections.

It has been found that with many woods of the type to be processed by the present invention, the size of the load that may be transported to the mill is not materially reduced when whole trees including tops are loaded onto the trucks with half a load having their butt ends facing one direction and the other half with their butt ends facing in the other. Generally, it has been found that the branches, when the load is built on the truck are forced closer to the bole and thus will require little if any extra space.

The present invention permits relatively simple handling of the trees by, for example, cutting them off at the stump with a shearer or the like, carrying them to the roadside and loading the trees onto a truck, which does not require high manpower or high capital outlay for huge equipment. Equipment for felling may simply be a shearer or the like mounted on a vehicle, and the vehicle may be designed to load the trees on its back and carry them to the roadside. Thus, with the present concept, there is no necessity for a man to walk through the bush to either cut the tree or load the tree, for skidding.

If desired, the tree sections may be slashed at the roadside, but preferably they are transported as above indicated to the mill as whole trees and are slashed at the mill into appropriate lengths for further processing. The system of the present invention is made possible by the surprising discovery that if whole trees, i.e. bole, branches and non-merchandizable top sections are slashed to appropriate length sections and fed into a conventional de-barking drum, adequate de-branching and de-barking of the trees is obtained. The branches are slashed and torn from the tree and the base of the branches that are left projecting from the tree facilitate de-barking of other tree sections, thereby in many cases improving barking efficiency and in any event providing relatively clean de-barked wood and a separated product that includes both bark and branches, and thus has a much higher fuel value.

It will also be noted with the present invention whole sections of a tree including the needles enter the de-barking drum and the needles are also separated from the tree in the drum. These needles leave with the bark and branches and may be separated therefrom for further utilization, i.e. extracting chemicals or the like. With prior techniques, the needles were left in the

3 forest, and there was no opportunity for economically collecting and processing the needles. Even when whole trees chipped without de-barking, there is no means for separation and collection of the needles, so that they may be processed separately.

SUMMARY OF THE INVENTION

Broadly, the present invention relates to the harvesting system for trees comprising felling whole trees including the bole section, top section and branches, said feeding said whole trees into a de-barking drum and de-barking and at least partially de-limbing said trees in said drum, thereby to provide de-barked wood for further processing and a bark and branch mixture of higher calorific value than normally available using conventional techniques. Preferably said whole trees are slashed into at least one top section and a plurality of branched bole sections before being fed to said drum.

BRIEF DESCRIPTION OF THE DRAWINGS

Further features, objects and advantages will be evident from the following detailed description of the preferred embodiment of the present invention taken in conjunction with the accompanying drawing.

Figure 1:
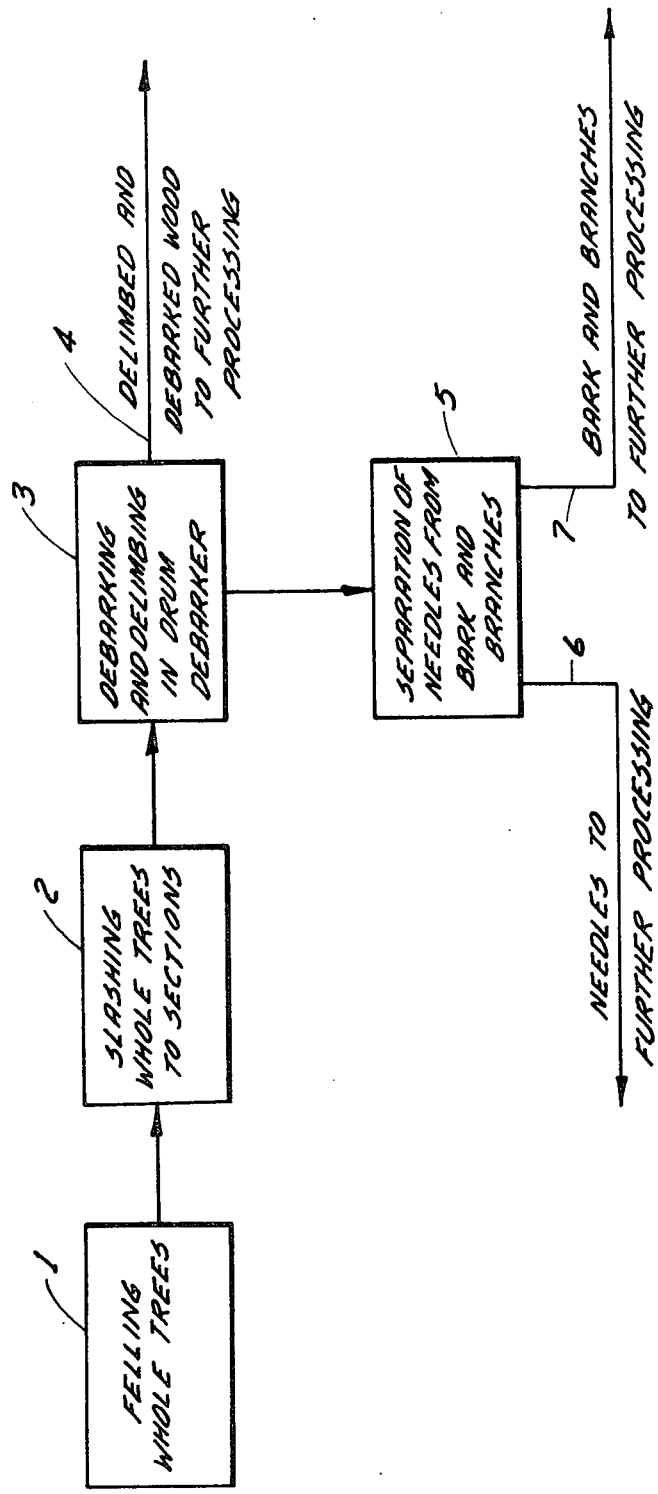
FIG. 1 is a schematic block diagram illustrating the system of the present invention.

As shown in the drawings, whole trees are felled as indicated by block 1 without removing of their branches and needles and the top sections. These felled whole trees are then preferably slashed as indicated by block 2 into discrete lengths or sections of 8, 10, 12 ft. etc., the length of the sections, of course, not exceeding that which can be handled by the de-barking drums. Generally, the sections will not be less than 8 ft., but on occasion if a section with larger branches is to be handled, it may be slashed into slightly shorter sections. In some cases where "parallel" barking is practiced and the trees are of appropriate size slashing may not be required.

After slashing, the sections are fed into conventional de-barking drums where they are de-barked and de-limbed to separate the bark, branches and needles from the wood as indicated by block 3. The de-limbed de-branched wood is then fed as indicated by the arrow 4 to further processing, which may include chipping to form chips for pulping or a combination of chipping, canting and sawing as desired.

The separated needles, bark and branches may all, if desired, be incinerated to produce heat for any suitable purpose, or the needles be separated from the bark and branches as indicated by the box 5, or the needles, bark and branches may be separated from each other. The separated needles may be fed as indicated by arrow 6 for further processing and similarly the bark and branches as indicated by the arrow 7. The bark and branches may be simply incinerated to obtain their calorific values or used for any other suitable purpose.

The barking drums are conventional barking drums; however, they may be used either wet or dry. It is much preferable to use dry de-barking if the branches and bark fraction is to be used for its calorific value and to reduce pollution problems. It has been found that when whole tree sections are fed to the de-barking drum, substantial 100% de-barking may be obtained even with the showers off, thereby permitting dry de-barking.

The following description relates to the logging of softwood trees in Northern Quebec using the system of the present invention.

Whole trees are felled without removing the branches and top of the bole and are moved to the logging road by skidding. At the road, they are loaded by arranging the butt ends of ½ of the trees toward the front of the truck, and the butt ends of the second half of the load at the rear of the truck. With this arrangement, the branches pack down and the capacity of the truck is generally increased somewhat due in part to the extra length of the load, since the top section has not been removed.

These tree sections are slashed into appropriate lengths at the mill. Generally about 8 ft., but if the system is used in conjunction with the sawmill, it may be desirable to use variable lengths, such as 10 or 12 ft. and even up to 16 ft. assuming that the de-barking drum can handle such lengths. It is also possible to use shorter lengths; however, this is not normally necessary, and normally is not to be done.

Slashed trees including the branched sections and the top are fed into a conventional de-barking drum and are processed according to conventional de-barking technology as used with the barking drums thereby to obtain substantially fully de-barked tree sections, which may be fed to a chipper, or alternatively, sorted and some fed to a sawmill, and others to the chipper for the pulp mill.

Generally with de-barking drums, water showers are used to help separate the bark. As above indicated it has been found that wet barking is not essential when whole trees are being processed. Thus, a dry de-barking system may be operated to provide a branch and bark fraction with a higher calorific value.

Table 1 outlines a typical set of conditions and results obtained for de-barking of branch sections and tops, i.e. whole trees in a conventional de-barking drum. The particular drum used had a length of 67 ft. 6 inches and a diameter of 12 ft. 8 inches, and the test was carried out on a mixture containing about 88% black spruce, 12% jackpine maximum, and 5% aspen maximum. The size of the wood varied from a minimum base diameter of 3 inches to a maximum of 36 inches, the length varied between 8 and 8½ ft.

It will be noted that with the door open, ½ open or closed, which leaves ½ of the drum open, approximately ⅓ of the drum open and ¼ of the drum open respectively, substantially 100% de-barking of the section was obtained. Thus, there apparently is ample residence time even with the doors wide open to obtain full de-barking.

Modifications may be made without departing from the spirit of the invention as defined in the appended claims.

TABLE I

| Test | Condition | Amperage | | % Barking eff. | Remarks |
|------|-----------|----------|----------|----------------|---------|
|      |           | Inlet End | Exit End |                |         |
| 1    | Door Open | 75       | 50       | 100            |         |
| 2    | Door Open | 75       | 55       | 100            |         |
| 3    | Door Open | 85       | 55       | 100            |         |

TABLE I-continued

| Test | Condition | Amperage Inlet End | Exit End | % Barking eff. | Remarks |
|---|---|---|---|---|---|
| 4 | Door Open | 85 | 55 | 100 | Dry debarking showers off |
| 5 | Door Open | 85 | 55 | 100 | Dry debarking showers off |
| 6 | Door ½ open | 80 | 55 | 100 | |
| 7 | Door ½ open | 75 | 60 | 100 | |
| 8 | Door ½ open | 75 | 60 | 100 | |
| 9 | Door ½ open | 75 | 60 | 100 | |
| 10 | Door ½ open | 80 | 60 | 100 | |
| 11 | Door closed | 75 | 55 | 100 | |
| 12 | Door closed | 75 | 55 | 100 | |
| 13 | Door closed | 75 | 60 | 100 | |

I claim:

1. A method of harvesting whole trees comprising felling whole trees including the bole section and normally unmerchandizable top section, branches and needles, delivering said whole trees to a mill, slashing each of said whole trees into a top section and at least one bole section having branches feeding said sections into one end of a de-barking drum and de-barking and at least partially de-limbing said sections in said drum; rejecting de-barked wood from the other end of said drum and also rejecting a bark branch and needle fraction through the periphery of said drum and collecting said bark, branch and needle fraction for further processing.

2. A system as defined in claim 1 wherein said sections are "dry" de-barked and de-limbed in said barking drums.

3. A method of harvesting whole trees comprising feeding whole trees including the bole, top, branches and needles, slashing said whole trees into sections including at least one top section and a plurality of branched bole sections each of said sections being approximately 8 ft. long, feeding said sections into a de-barking drum and de-barking and at least partially de-limbing said sections in said drum, thereby to provide de-barked wood and a bark, branch and needle fraction for further processing, separating said bark, branch and needle fraction into needles and a mixture of bark and branches whereby said needles may be processed separately from said bark and said branches.

4. A system as defined in claim 3 wherein said sections are "dry" de-barked and de-limbed in said de-barking drums.

* * * * *